(12) United States Patent
Schulman

(10) Patent No.: US 9,602,505 B1
(45) Date of Patent: Mar. 21, 2017

(54) DYNAMIC ACCESS CONTROL

(71) Applicant: Symantec Corporation, Mountain View, CA (US)

(72) Inventor: Martin Schulman, Herndon, VA (US)

(73) Assignee: Symantec Corporation, Mountain View, CA (US)

( * ) Notice: Subject to any disclaimer, the term of this patent is extended or adjusted under 35 U.S.C. 154(b) by 24 days.

(21) Appl. No.: 14/266,518

(22) Filed: Apr. 30, 2014

(51) Int. Cl.
*H04L 29/06* (2006.01)

(52) U.S. Cl.
CPC ................... *H04L 63/0838* (2013.01)

(58) Field of Classification Search
CPC .................................................. H04L 63/0823
See application file for complete search history.

(56) References Cited

U.S. PATENT DOCUMENTS

| | | | | |
|---|---|---|---|---|
| 7,565,547 B2 * | 7/2009 | Matta | ...................... | G06F 21/31 713/182 |
| 7,624,431 B2 * | 11/2009 | Cox | ................... | H04L 63/0272 380/270 |
| 8,024,785 B2 * | 9/2011 | Andress | .................. | H04L 63/08 726/11 |
| 8,185,961 B2 * | 5/2012 | Ichikawa | .............. | G06F 21/575 707/821 |
| 8,832,812 B1 * | 9/2014 | Morneau | ............. | H04L 63/0853 726/7 |
| 8,978,100 B2 * | 3/2015 | Counterman | ........... | H04L 9/321 726/27 |
| 9,240,886 B1 * | 1/2016 | Allen | ........................ | H04L 9/32 |
| 2001/0056550 A1 * | 12/2001 | Lee | ....................... | H04L 63/083 726/11 |
| 2002/0177433 A1 * | 11/2002 | Bravo | ................. | H04L 63/0853 455/411 |
| 2007/0180493 A1 * | 8/2007 | Croft | ..................... | G06F 3/1415 726/2 |
| 2008/0313719 A1 * | 12/2008 | Kaliski, Jr. | ......... | H04L 63/0815 726/5 |
| 2009/0325645 A1 * | 12/2009 | Bang | ....................... | G06F 3/016 455/566 |
| 2011/0023088 A1 * | 1/2011 | Ko | ........................ | H04L 63/102 726/3 |
| 2014/0020073 A1 * | 1/2014 | Ronda | ..................... | G06F 21/31 726/7 |

* cited by examiner

*Primary Examiner* — Shanto M Abedin
*Assistant Examiner* — Khoi Le
(74) *Attorney, Agent, or Firm* — Holland & Hart LLP

(57) ABSTRACT

A computer-implemented method for securing data and computer systems is described. In one embodiment, a request to connect to a server is received at an intermediary network device. It is detected, at the intermediary network device, that the server uses a one-time password (OTP) protocol. Based at least in part on the detecting that the server uses an OTP protocol, an action is performed by the intermediary network device. The action may include blocking, at the intermediary network device, a connection other than the connection to the server that uses the OTP protocol.

20 Claims, 6 Drawing Sheets

DYNAMIC ACCESS CONTROL

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The wide-spread access to media has been accelerated by the increased use of computer networks, including the Internet and cloud networking.

Many homes and businesses use computer networks to generate, deliver, and receive data and information between the various connected computers. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of and continued advancements in secure data communications. For example, advancements in mobile devices allow users to make secure connections and virtual private networks (VPNs) with corporate servers. Nevertheless, benefits may be realized by providing systems and methods for improving an authentication process.

SUMMARY

According to at least one embodiment, a computer-implemented method for securing data and computer systems is described. In one embodiment, a request to connect to a server may be received at an intermediary network device. The intermediary network device may include at least one of a router, a switch, a modem, a firewall, a hub, a hotspot, a wireless access point, a server, a proxy server, a gateway device, an intrusion detection system (IDS) device, an intrusion prevention system (IPS) device, an Internet service provider (ISP) device, and the like. In some embodiments, it may be detected, at the intermediary network device, that the server uses a one-time password (OTP) protocol. Based at least in part on the detecting that the server uses an OTP protocol, an action may be performed by the intermediary network device.

In some embodiments, performing the action may include blocking a connection between a first client device that sent the request and a computing device connected to the first client via the intermediary network device. The connection may be blocked for a duration that is at least as long as a lifetime of an OTP used in the OTP protocol. Additionally, or alternatively, performing the action may include allowing a connection between the first client device that sent the request and a computing device other than the server, blocking at least one connection of a second client device, and allowing at least one connection between the second client device and a computing device other than the server. The second client may be connected to the computing device via the intermediary network device.

In one embodiment, detecting that the server uses an OTP protocol may include inspecting a secure socket layer (SSL) certificate received from the server and detecting information from the SSL certificate identifying the server as limiting access via an OTP. Additionally, or alternatively, detecting that the server uses an OTP protocol may include analyzing information preconfigured at the intermediary network device, accessing a list of information identifying one or more servers that use the OTP protocol, and/or detecting a keyword or pattern of characters in a uniform resource locator (URL) associated with the server.

In some embodiments, a request from the server for credentials may be received at the intermediary network device. Accordingly, a human-authentication challenge may be provided by the intermediary network device to control access to the server. In some cases, an identity of the server may be verified by the intermediary network device. Upon verifying the identity of the server, the request to connect to the server may be allowed to proceed.

A computing device configured to secure data is also described. The device may include a processor and memory in electronic communication with the processor. The memory may store instructions that are executable by the processor to receive, at an intermediary network device, a request to connect to a server, detect, at the intermediary network device, that the server uses a one-time password (OTP) protocol, and perform, by the intermediary network device, an action based at least in part on the detecting.

A computer-program product to secure data is also described. The computer-program product may include a non-transitory computer-readable medium that stores instructions. The instructions may be executable by a processor to receive, at an intermediary network device, a request to connect to a server, detect, at the intermediary network device, that the server uses a one-time password (OTP) protocol, and perform, by the intermediary network device, an action based at least in part on the detecting.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
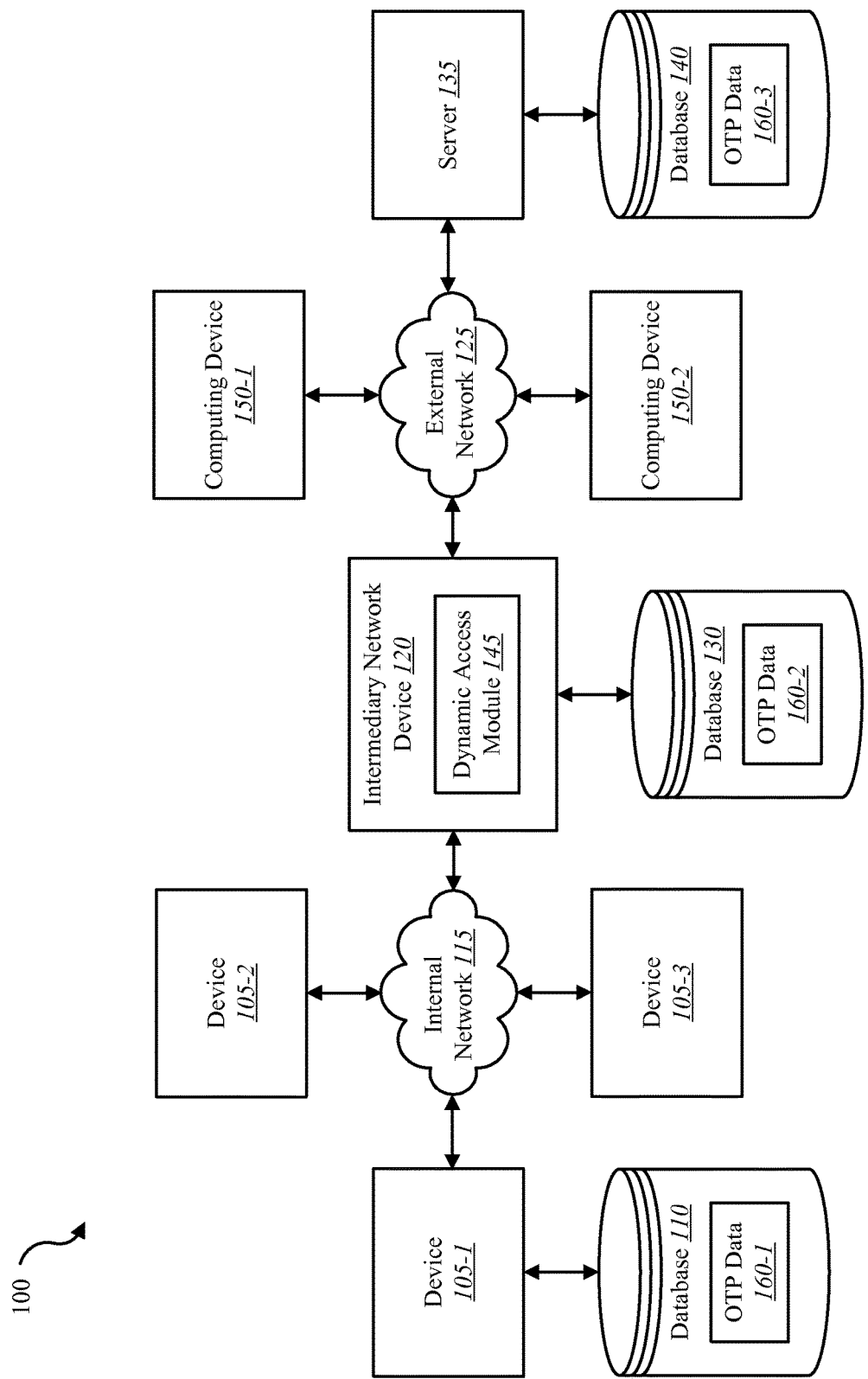
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed.

Rather, the instant disclosure covers all modifications, equivalents, and alternatives falling within the scope of the appended claims.

DETAILED DESCRIPTION OF EXEMPLARY EMBODIMENTS

The systems and methods described herein relate to dynamic access control. More specifically, the systems and methods described herein relate to dynamic access control in relation to one-time passwords (OTPs). Some embodiments of the systems and methods described herein relate to dynamic access control in relation to a server using one-time passwords for authentication in remote access conditions.

An OTP may be a password that is valid for only a single login session or transaction. In contrast to static passwords, OTPs are not vulnerable to replay attacks. A potential intruder who manages to record an OTP that was already used to log into a service or to conduct a transaction will not be able to abuse it, since it will be no longer valid after its first use. OTPs are generally based on time-synchronization between the authentication server and the client providing the password. For instance, a generated OTP may be valid for only 30-60 seconds after being generated. After the predetermined time, the generated OTP expires. Once the OTP expires it cannot be used to access the server, even if it was never used during the OTP lifetime. In some cases, OTPs may be generated using a mathematical algorithm. For example, a new password may be based on a previously generated password. In some cases a new OTP may be generated based on a mathematical algorithm where the new password is based on a random number chosen by the authentication server, based on unique transaction details, and/or based on a counter.

The OTP protocol may protect against replay and other attacks, but OTPs are vulnerable to theft during their 30-60 second lifetime. If a host computer has been infiltrated by a hacker's machine, the hacker may be able to login into the host computer remotely, see everything that is done on the host computer, control its operation, and thus, obtain the OTP in a timely manner.

Typically, OTPs are used to protect remote resources of high-value such as banking and corporate VPNs. In some cases OTPs may be used in residential computing systems. Accordingly, the systems and methods described herein apply to corporate environments as well as residential environments. For example, OTPs may be used in an office where a person with financial responsibility accesses a banking website to transfer funds. Such an office might have multiple Internet connections, with routers and/or intermediate devices for each connection performing the systems and methods described herein independently and/or cooperatively. Accordingly, if an OTP password is stolen by the hacker, the remote resource may be compromised. In some cases, the hacker may block legitimate use of the OTP before the intended user is able to use it. For example, the hacker may corrupt a communication of the OTP from the host computer to the OTP server by inserting one or more characters into the communication, thus preventing the intended user's use of the OTP, and allowing the hacker to use the intercepted OTP to access the protected resource.

In one embodiment, the systems and methods described herein relate to an intermediary network device such as a switch, a router, a firewall, a proxy server, or a like device that sits between an internal network (e.g., home or office network) and the Internet. As described herein, an intermediary network device may be configured to remediate the vulnerability window during which an OTP may be stolen and used by the hacker before an intended user is able to use it. Based on the systems and methods described herein, the corporate VPN, banking system, and other remote high-valued resource is protected even if the user's PC is completely "owned" by a remote attacker.

In one example, a home router controls all traffic between each local computer at the home. The home router may provide a wired and/or wireless home data communication network. The home router may be used by a first local computer to connect to a remote server. The remote server may use the OTP protocol to authenticate connections and serve an OTP-controlled resource. Accordingly, the home router may control all traffic between the home computing devices and the Internet, and the device through which OTP authentication transaction may be transmitted. Thus, based on the systems and methods described herein, the home router may be configured to block traffic that is not directed to or from the remote OTP-controlled resource, preventing an attacker that remotely controls the first local computer from intercepting the temporary OTP credential.

In some cases, the router may identify which sites are protected using OTP protocols. When a secure session that uses OTP protocols is established, the router may interrupt traffic to other sites, preventing in real-time a remote attacker from stealing the credential. In one example, the router may permit traffic that is unlikely to serve as a covert channel, to reduce user inconvenience. The duration of the block may vary. For example, a minimum duration may be configured to last at least as long as the lifetime of the OTP credential. In some cases, the block may be configured to last as long as the session remains active in order to prevent a remote user from hijacking the session from the compromised computer.

FIG. 1 is a block diagram illustrating one embodiment of an environment 100 in which the present systems and methods may be implemented. In some embodiments, the systems and methods described herein may be performed on a client device (e.g., device 105). The environment 100 may include devices 105-1, 105-2 and 105-3, an internal external network 125 provided by intermediary network device 120, and through which clients devices 105 may connect to an external network 125. Environment 100 may also include a server 135, one or more computing devices such as computing devices 150-1 and 150-2, and the external network 125 that allows the devices 105, server 135, computing devices 150, and databases 110, 130, and 140 to communicate with each other.

Examples of the devices 105 include set top boxes providing access to media content, gaming consoles, home automation system, data storage system, mobile devices, smart phones, personal computing devices, computers, laptops, desktops, servers, and generally any computing device able to connect to a data communication network. Examples of computing devices 150 may include mobile computing devices, laptops, desktop computers, servers, etc. Examples of server 135 may include a data server, a corporate server, a service provider server, a banking server, a home automation server, etc. In some cases, server 135 may implement an OTP protocol.

In some configurations, devices 105 may include a user interface, a software application, and/or at least a portion of a dynamic access module similar to dynamic access module 145 of intermediary network device 120. In some embodiments, a software application may be installed on device 105-1 that enables a user to interface with a function of intermediary network device 120, dynamic access module 145, and/or server 135. For example, device 105-1 may include an application that allows device 105-1 to interface with the dynamic access module 145 on another device such as intermediary network device 120 and/or server 135. In some cases, server 135 may include at least a portion of a dynamic access module similar to dynamic access module 145 of intermediary network device 120. In some embodiments, devices 105 may communicate with server 135 via internal network 115 and external network 125. Examples of networks 115 and/or 125 may include cloud networks, local area networks (LAN), wide area networks (WAN), virtual private networks (VPN), wireless networks (using 802.11, for example), cellular networks (using 3G and/or LTE, for example), etc. In some configurations, the external network 125 may include the Internet. In some embodiments, devices 105 and/or server 135 may include a dynamic access module where at least a portion of the functions of dynamic access module 145 are performed separately and/or concurrently on devices 105 and/or server 135. In some embodiments, device 105-1 depicts a mobile device with a mobile application that interfaces with one or more functions of intermediary network device 120, dynamic access module 145, and/or server 135.

In some embodiments, device 105-1 may be coupled to database 110, server 135 may be coupled to database 130, and/or server 135 may be coupled to database 140. As illustrated, the databases of FIG. 1 may include OTP data 160. OTP data 160 may include data related to OTP servers that is preconfigured on intermediary network device 120 (e.g., OTP data 160-2). In some cases, OTP data 160 may include user policy data related to a blacklist and/or a whitelist (e.g., connections to block during an OTP authentication, connections to allow to continue during an OTP authentication, computing devices to block during an OTP authentication, and/or computing devices to allow to continue communicating with external network 125 during an OTP authentication). In one embodiment, OTP data 160 may include a list of OTP servers and/or keywords associated with known OTP servers. Accordingly, intermediary network device 120 may access OTP data 160-1 via internal network 115, access OTP data 160-2 via database 130, and/or access OTP data 160-3 via external network 125 and server 135.

Dynamic access module 145 may be configured to control access between devices connected to internal network 115 and devices connected to external network 125. Thus, dynamic access module 145 may control access between client devices 105 on internal network 115 and devices 150 on external network 125. For instance, computing device 150-1 may be one example of a computing device used by a hacker that has gained surreptitious or covert access to device 105-1. The hacker on computing device 150-1 may have a connection with device 105-1 when device 105-1 requests to connect to server 135. Server 135 may request credentials from device 105-1 before granting access to its remote resources. For example, server 135 may request a user name, a static password, as well as a one-time password, or OTP, before granting access. In some cases, the hacker may be logged into client 105-1 while the request to connect to server 135 is communicated. Additionally, or alternatively, the hacker may plant a bot, or software robot, on device 105-1. The bot may be configured to intercept the OTP data and/or obstruct transmission of the OTP credentials to server 135. Accordingly, upon identifying the request from device 105-1 to connect to server 135 being associated with an OTP protocol, dynamic access module 145 may sever the connection between device 105-1 and computing device 150-1, thus blocking the hacker from intercepting the OTP information in real-time. If the hacker has planted a bot on device 105-1, dynamic access module 145 may also block the bot from using the OTP information to gain access to server 135. Further details regarding the dynamic access module 145 are discussed below.

Figure 2:
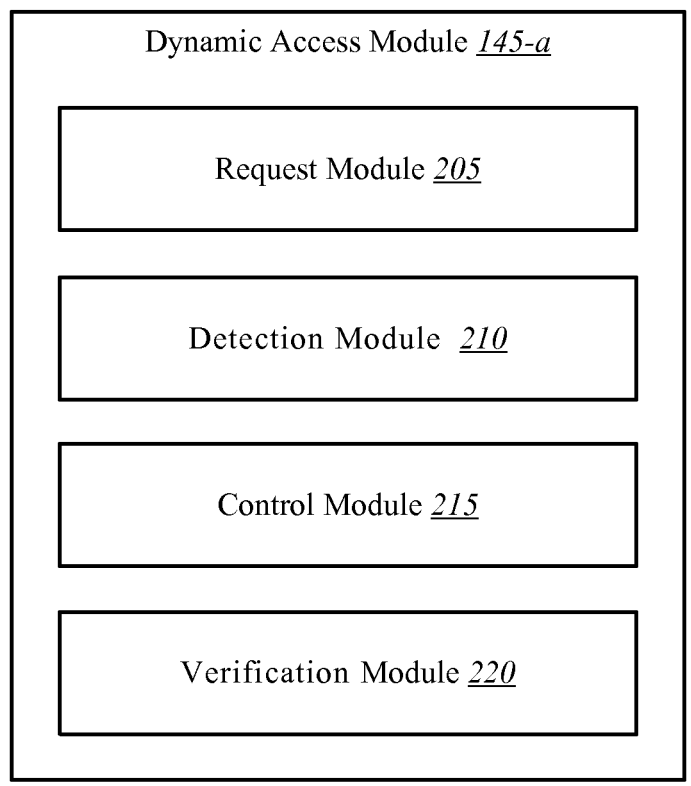
FIG. 2 is a block diagram illustrating one example of a dynamic access module.

FIG. 2 is a block diagram illustrating one example of a dynamic access module 145-*a*. Dynamic access module 145-*a* may be one example of dynamic access module 145 depicted in FIG. 1. As depicted, dynamic access module 145-*a* may include a request module 205, a detection module 210, a control module 215, and a verification module 225.

In one embodiment, at least one aspect of dynamic access module 145-*a* may include software and/or hardware elements of a network data communication system. For example, the dynamic access module 145-*a* may be part of an intermediary network device such as intermediary network device 120. An intermediary network device may include any combination of software and hardware configured to operate in a data network between two or more computing devices. Some examples of intermediary network devices include a router, a switch, a modem, a firewall, a hub, a hotspot, a wireless access point, a server, a proxy server, a gateway device, an intrusion detection system (IDS) device, an intrusion prevention system (IPS) device, and an Internet service provider (ISP) device, and the like. Accordingly, an intermediary network device may include a residential switch router in a home that is configured to connect one or more computing devices within the home to the Internet, to connect a device in the home with another device in the home, and/or connect one or more computing devices within the home with a computing device external to the home. In some cases, the residential switch router may include an 802.11 wireless router.

In one embodiment, request module 205 may receive a request to connect to a server (e.g., server 135). Taking the residential switch router example above, request module 205 may detect a request from a computing device in the home to connect to a server external to the home. For instance, the computing device in the home may request to connect to a corporate server via a virtual private network (VPN). In addition to the typical username and password authentication protocol, the corporate server may implement a one-time password (OTP) protocol. For example, an OTP may be generated every 30-60 seconds. As described above, the OTP protocol may include the repetitive generation of a random or pseudo-random password with an expiration. Thus, in addition to the static username and password, a user enters the OTP as well in order to gain access to the server. After being generated, the OTP may be used only once and if it is not used within the predetermined time period (e.g., 30-60 seconds), then that particular password expires.

In one embodiment, detection module 210 may detect that the server uses an OTP protocol. In one example, detection module 210 may inspect a secure socket layer (SSL) certificate received from the server. For example, the server may respond to receiving the request to connect by sending an SSL certificate to the client. The intermediary network device may intercept the SSL certificate, allowing the detection module 210 to inspect the SSL certificate. In some cases, the SSL certificate may include information indicating that the server implements the OTP protocol. Thus, detection module 210 may enable an intermediary network device to detect that the server uses an OTP protocol by analyzing information associated with an SSL certificate from the server. Accordingly, detection module 210 may refer to the SSL certificate upon detecting a request to connect to a server. Upon identifying information indicating that the requested server implements an OTP protocol, the detection module 210 may trigger one or more actions.

In some embodiments, detection module 210 may analyze information stored on a computing device such as a server, a personal computer, a mobile computing device, a smart phone, and the like (e.g., devices 105, server 135, databases 110, 130, and/or 140). In some cases, information regarding an OTP server may be stored on a network device. For example, information regarding the server may be stored on an intermediary network device. For instance, the information regarding the server may include an identifier of the server such as an internet protocol (IP) address, a domain name, a media access control (MAC) address, a globally unique identifier (GUID), and the like. Thus, detection module 210 may analyze information stored on the intermediary network device to detect an OTP server. Upon identifying a match between the requested server and information stored on the intermediary network device, the detection module 210 may trigger one or more actions.

In some embodiments, detection module 210 may access a list of information identifying one or more servers that use the OTP protocol. The list of information may include a dynamically maintained list of OTP servers. For example, a user, a network administrator, a data access service provider (e.g., Internet, mobile wireless, etc.), a security entity such as SYMANTEC®, and the like, may maintain a list that is updated with additions, modifications, and deletions of OTP servers. For instance, the entity may automate a process of adding, deleting, and modifying elements of the list and publishing the list to the Internet, making an up-to-date list dynamically available from the Internet. Accordingly, detection module 210 may refer to the dynamically maintained list upon detecting a request to connect to a server. Upon identifying a match between the requested server and an OTP server included on the list, the detection module 210 may trigger one or more actions.

In one embodiment, detection module 210 may detect a keyword or pattern of characters in a uniform resource locator (URL) associated with the server. For example, in one configuration, an OTP server may include a keyword in a URL such as "https://secure.server.com/otp/" where the keyword "otp" is detected by detection module 210. Accordingly, detection module 210 may analyze a URL associated with the server upon detecting a request to connect to a server. Upon identifying a matching keyword or pattern of characters associated with the requested server, the detection module 210 may trigger one or more actions.

In one embodiment, control module 215 may perform an action based at least in part on detecting a request to connect to a server. In some cases, the action may be performed in relation to an intermediary network device. For example, control module 215 may be configured to control access in relation to connections in an intermediary network device. Accordingly, the action performed may include blocking one or more connections and/or allowing one or more connections connected through an intermediary network device. In some cases, the action performed may include stalling a connection, resetting a connection, performing active filtering on a connection, and otherwise affecting one or more connections in a way that at least partially impedes the one or more connections. Thus, in some cases, control module 215 may block a connection between a client that sends a request to connect to an OTP server and a computing device connected to the first client via the intermediary network device. At the same time, control module 215 may allow a second connection, stall a third connection, reset a fourth connection, perform active filtering on a fifth connection, etc. For example, a client machine may be connected to a news server of a news website such as www.news-website.com when the client machine requests to connect to an OTP server. Upon detecting the request to connect to the OTP server, control module 215 may block the connection between the client machine and the news server of the www.news-website.com website. In some cases, the client machine may be hacked by a computing device that connects to the client machine through an intermediary network device used by the client machine. This malicious computing device may present a man-in-the-middle (MITM) attack in an attempt to gain access to the resources of the OTP server by intercepting and using the OTP provided to the user of the client machine. To thwart such an attack, control module 215 may block the connection between the client machine and the malicious computing device, cutting off the malicious computing device's direct access to the client machine, and thus preventing the user of the malicious computing device from intercepting the OTP. Thus, in accordance with FIG. 1, device 105-1 may request to gain access to server 135, an OTP server. Intermediary network device 120 may detect the request being made is related to an OTP server. Upon detecting the request is related to an OTP server, intermediary network device 120 may permit the connection between device 105-1 and the OTP server, server 135, while blocking one or more connections of device 105-1 and/or client devices 105-2 and 105-3.

In some cases, the malicious computing device may plant a bot (i.e., software robot) or virtual agent on the client machine. Accordingly, the malicious computing device may still have indirect access to the client machine even after the control module 215 blocks the malicious computing device's connection to the client machine via the intermediary network device. For example, the bot may be configured to intercept the OTP, but with the connection to the malicious computing device blocked, the malicious computing device is blocked from using the OTP intercepted by the bot. Thus, in some cases, having acquired credentials of a user on the client machine, the bot may be configured to intercept the OTP and access the OTP server using the intercepted OTP before a user of the client machine is able to use the OTP to gain access to the OTP server. Accordingly, in some embodiments, verification module 225 may receive a request for credentials from the server and then provide, in conjunction with the intermediary network device, a human-authentication challenge to control access to the server. For example, verification module 225 may implement a Completely Automated Public Turing test to tell Computers and Humans Apart (CAPTCHA) in order to block a bot from accessing OTP server. In some embodiments, verification module 225 may verify, in conjunction with the intermediary network device, an identity of the requested server. A malicious computing device may scrape data from OTP server and present a counterfeit server. Accordingly, upon detecting a request to connect to an OTP server, verification module 225 may verify the identity of the server. The identity of the server may be verified by a certificate, by IP address, MAC address, a domain name, GUID, and the like. Upon verifying the server, verification module 225 may allow the request to connect to the server to proceed.

In one embodiment, control module 215 may allow a connection between the client machine making the request and a computing device other than the OTP server. For example, a user may configure a policy to allow certain connections and/or to block certain connections. In one embodiment, the policy may be configured to specify connections that are allowed to continue when the client machine connects to OTP server and block all other connections not specified in the policy. In some embodiments, the policy may be configured to specify computing devices that are to be blocked and/or computing devices that are allowed to continue communicating via the intermediary network device when the client machine requests to connect to the OTP server. Thus, control module 215 may allow a connection between a second client device and a computing device other than the requested OTP server. Thus, while a first client device such as device 105-1 makes a request to connect to an OTP server such as server 135, a second client device such as device 105-2 may have an active connection with an external computing device such as computing device 150-2, and this connection of the second client device may be allowed to continue while the first client device connects to the OTP server. For example, a computing device such as a gaming console may reside in the same home as the client machine making the request to connect to the OTP server. The gaming console may also make external connections via the intermediary network device. Thus, when the client machine requests to connect to the OTP server, a connection of the gaming console may be allowed to continue during the client machine's session with the OTP server. In some cases, control module 215 may be configured to block at least one connection between the second client device and a computing device other than requested the server.

Figure 3:
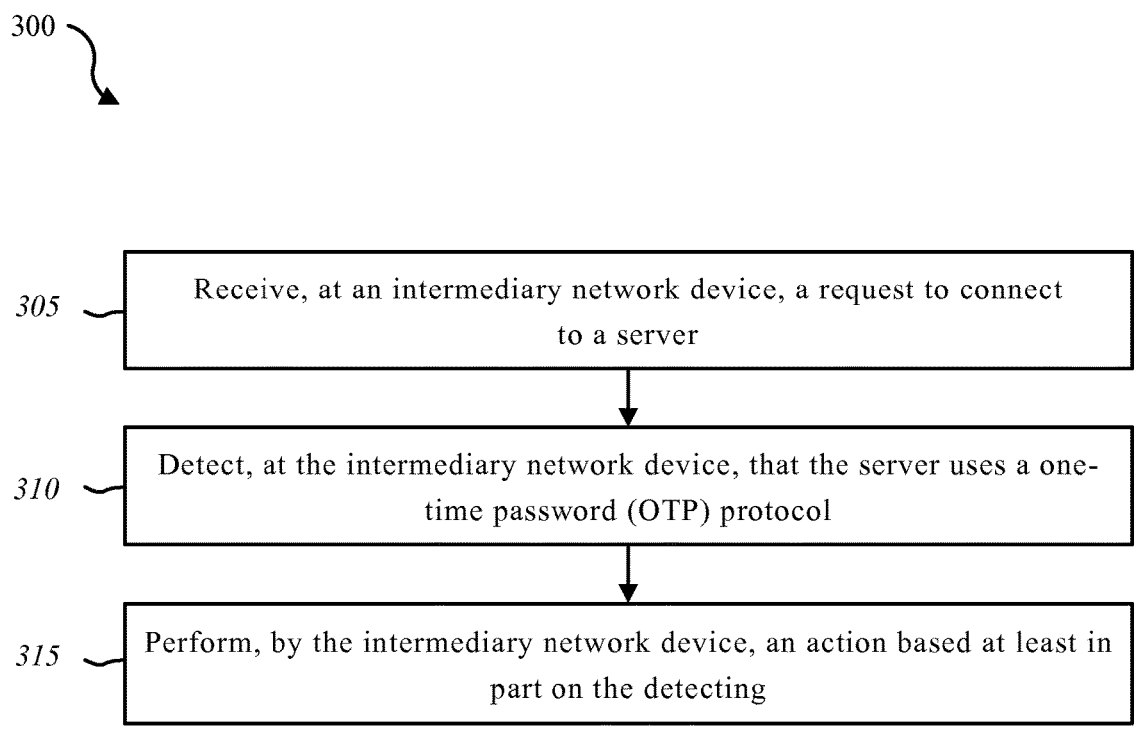
FIG. 3 is a flow diagram illustrating one embodiment of a method for dynamic access control.

FIG. 3 is a flow diagram illustrating one embodiment of a method 300 for dynamic access control. In some configurations, the method 300 may be implemented by the dynamic access module 145 illustrated in FIG. 1 or 2. In some configurations, the method 300 may be implemented in conjunction with a software application and/or a user interface of device 105-1 in FIG. 1.

At block 305, a request to connect to a server may be received at an intermediary network device. At block 310, it may be detected, at the intermediary network device, that the server uses a one-time password (OTP) protocol. At block 315, an action may be performed by the intermediary network device based at least in part on the detection that the server uses an OTP protocol.

Figure 4:
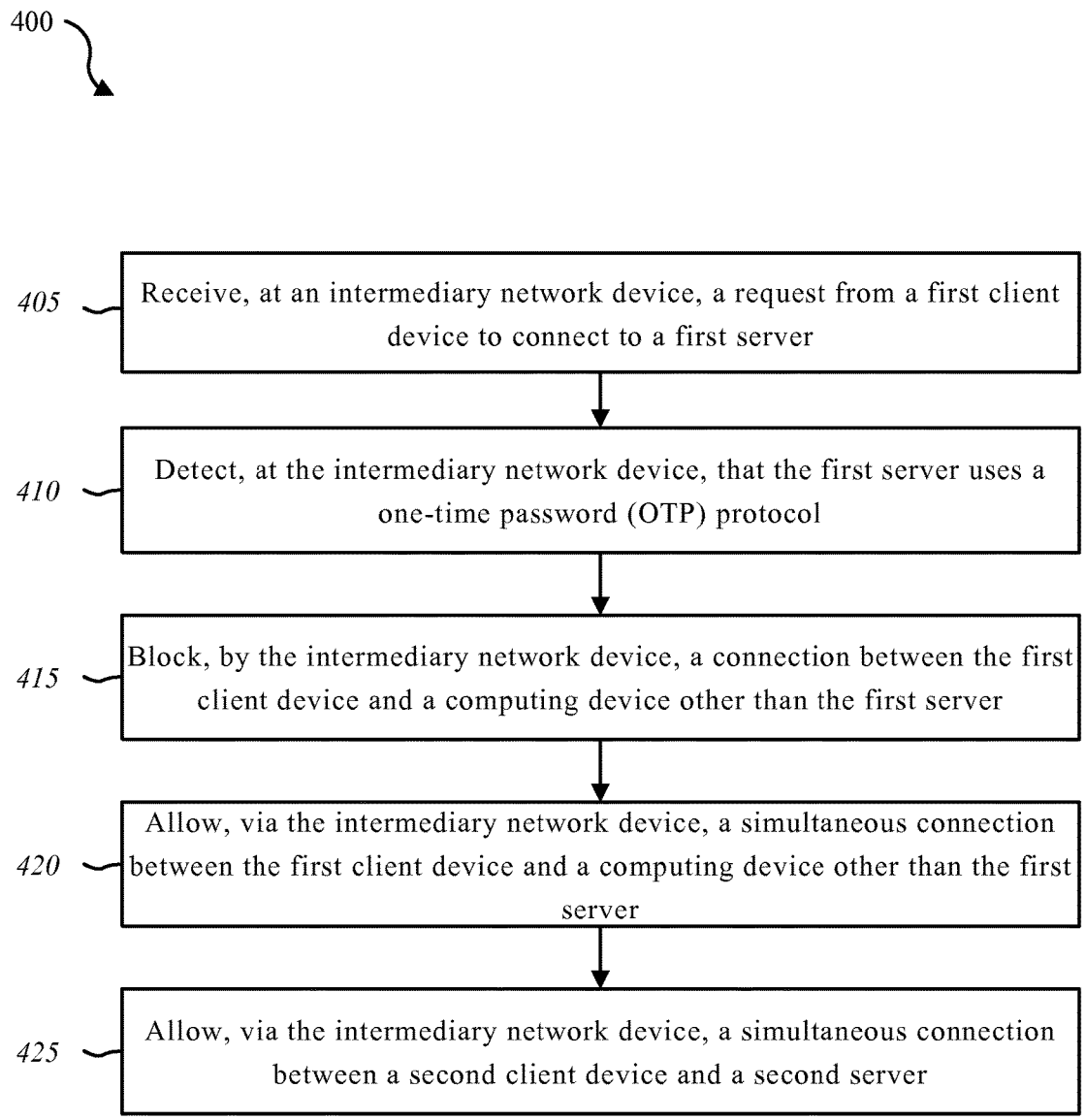
FIG. 4 is a flow diagram illustrating another embodiment of a method for dynamic access control.

FIG. 4 is a flow diagram illustrating another embodiment of a method 400 for dynamic access control. In some configurations, the method 400 may be implemented by the dynamic access module 145 illustrated in FIG. 1 or 2. In some configurations, the method 400 may be implemented in conjunction with a software application and/or a user interface of device 105-1 in FIG. 1.

At block 405, a request from a first client device to connect to a server may be received at an intermediary network device. At block 410, it may be detected, at the intermediary network device, that the server uses a one-time password (OTP) protocol. At block 415, a connection between the first client device and a computing device other than the server may be blocked via the intermediary network device. In some cases, the connection may be blocked for a duration that is at least as long as a predetermined lifetime of an OTP credential used in the OTP protocol. At block 420, a connection between the first client device and a computing device other than the server may be allowed simultaneously with the connection between the first client and the first server. At block 425, a connection between a second client device and a second server may also be simultaneously allowed via the intermediary network device.

Figure 5:
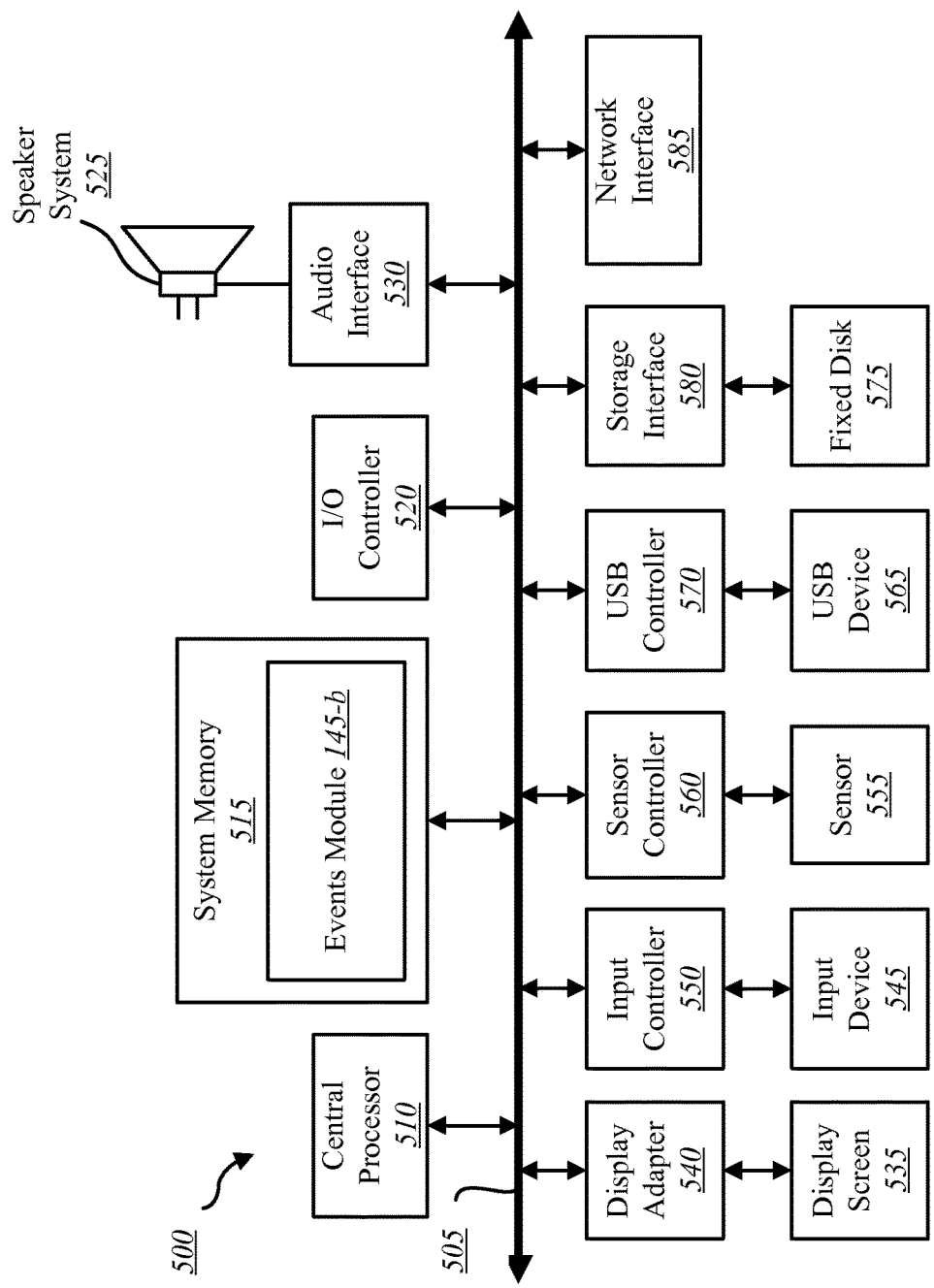
FIG. 5 depicts a block diagram of a computer system suitable for implementing the present systems and methods.

FIG. 5 depicts a block diagram of a controller 500 suitable for implementing the present systems and methods. The controller 500 may be an example of device 105, intermediary network device 120, and/or server 135 illustrated in FIG. 1. Although depicted in an architecture similar to a personal computer and/or server-type device, in some cases, the architecture of controller 500 may include an embedded computing system architecture where software code is executed from flash memory and the system operates free from a basic input/output system (BIOS).

In one configuration, controller 500 includes a bus 505 which interconnects major subsystems of controller 500, such as a central processor 510, a system memory 515 (typically RAM, but which may also include ROM, flash RAM, or the like), an input/output controller 520, an external audio device, such as a speaker system 525 via an audio output interface 530, an external device, such as a display screen 535 via display adapter 540, an input device 545 (e.g., remote control device interfaced with an input controller 550), one or more USB devices 565 (interfaced with a USB controller 570), and a storage interface 580. Also included are at least one sensor 555 connected to bus 505 through a sensor controller 560 and a network interface 585 (coupled directly to bus 505).

Bus 505 allows data communication between central processor 510 and system memory 515, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the dynamic access module 145-b to implement the present systems and methods may be stored within the system memory 515. Applications resident with controller 500 are generally stored on and accessed via a non-transitory computer readable medium, such as a hard disk drive (e.g., fixed disk 575) or other storage medium. Additionally, applications can be in the form of electronic signals modulated in accordance with the application and data communication technology when accessed via interface 585.

Storage interface 580, as with the other storage interfaces of controller 500, can connect to a standard computer readable medium for storage and/or retrieval of information, such as a fixed disk drive 575. Fixed disk drive 575 may be a part of controller 500 or may be separate and accessed through other interface systems. Network interface 585 may provide a direct connection to a remote server via a direct network link to the Internet via a POP (point of presence). Network interface 585 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 500 wirelessly via network interface 585.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 5 need not be present to practice the present systems and methods. The devices and subsystems can be interconnected in different ways from that shown in FIG. 5. The aspect of some operations of a system such as that shown in FIG. 5 are readily known in the art and are not discussed in detail in this application. Code to implement the present disclosure can be stored in a non-transitory computer-readable medium such as one or more of system memory 515 or fixed disk 575. The operating system provided on controller 500 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 6:
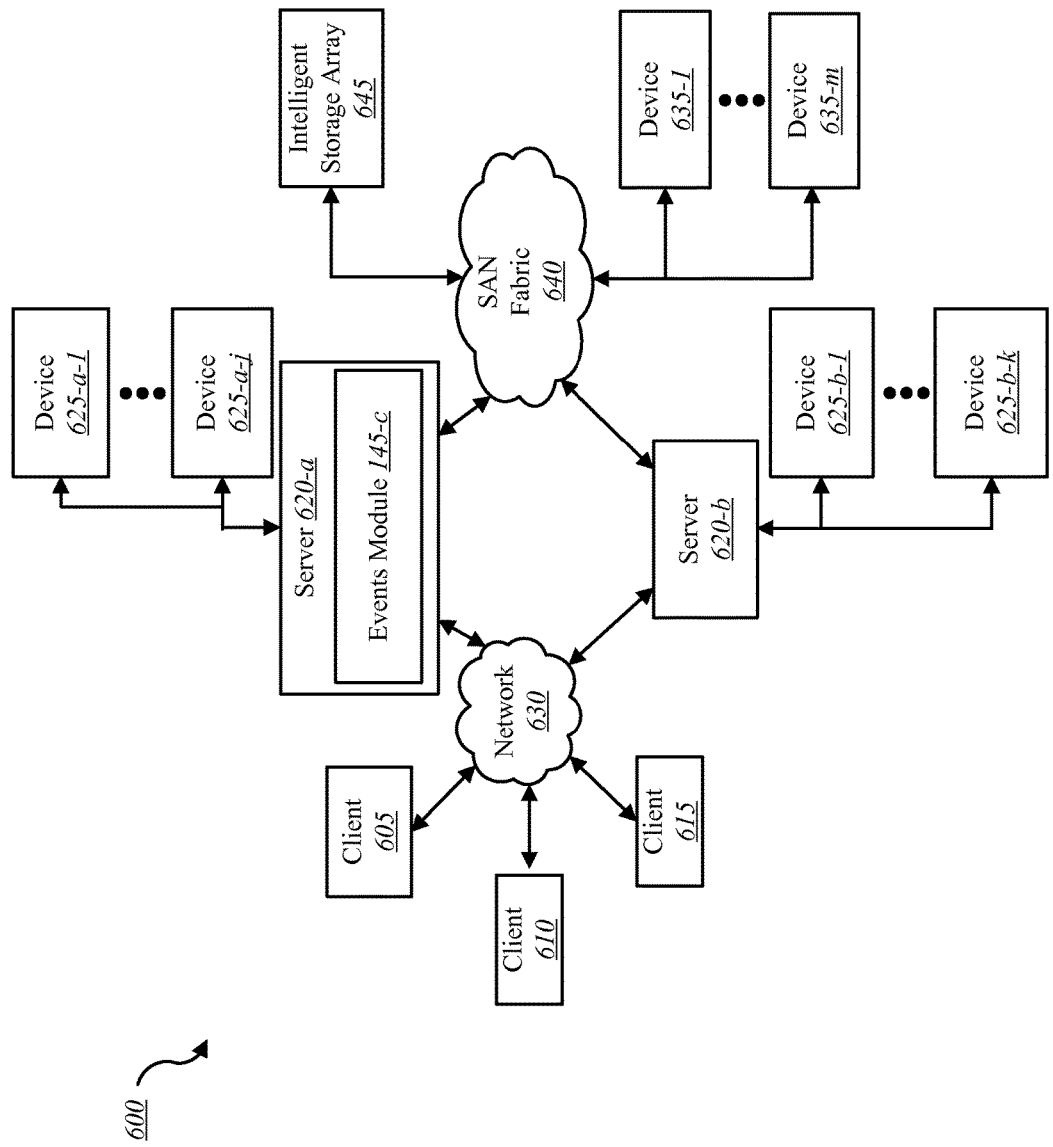
FIG. 6 is a block diagram depicting a network architecture in which client systems, as well as storage servers (any of which can be implemented using the computer system).

FIG. 6 is a block diagram depicting a network architecture 600 in which client systems 605, 610 and 615, as well as storage servers 620-*a* and 620-*b* (any of which can be implemented using computer system 600), are coupled to a network 630. In one embodiment, events module 145-*c* may be located within one of the storage servers 620-*a*, 620-*b* to implement the present systems and methods. Events module 145-*c* may be one example of events module 145 depicted in FIGS. 1, 2, and/or 6. The storage server 620-*a* is further depicted as having storage devices 625-*a*-1 through 625-*a*-*j* directly attached, and storage server 620-*b* is depicted with storage devices 625-*b*-1 through 625-*b*-*k* directly attached. SAN fabric 640 supports access to storage devices 635-1 through 635-*m* by storage servers 620-*a* and 620-*b*, and so by client systems 605, 610 and 615 via network 630. Intelligent storage array 645 is also shown as an example of a specific storage device accessible via SAN fabric 640.

With reference to computer system 600, network interface 685 or some other method can be used to provide connectivity from each of client computer systems 605, 610 and 615 to network 630. Client systems 605, 610 and 615 are able to access information on storage server 620-*a* or 620-*b* using, for example, a web browser or other client software (not shown). Such a client allows client systems 605, 610 and 615 to access data hosted by storage server 620-*a* or 620-*b* or one of storage devices 625-*a*-1-625-*a*-*j*, 625-*b*-1-625-*b*-*k*, 635-1-635-*m* or intelligent storage array 645. FIG. 6 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A method for securing data and computer systems, comprising:
   receiving, at an intermediary network device, a request from a first client device to connect to a server;
   verifying, by the intermediary network device, an identity of the server;
   detecting, at the intermediary network device, that the server uses a one-time password (OTP) protocol, wherein detecting that the server uses an OTP protocol comprises comparing the identity of the server with a list of information identifying a plurality of servers that use the OTP protocol and associated user-defined policy protocol; and
   performing, by the intermediary network device, an action according to the user-defined policy protocol based at least in part on the detecting, wherein performing the action comprises at least one of:

blocking, at the intermediary network device, a first connection between the first client device and a first computing device other than the server, the first computing device connected to the first client device via the intermediary network device; and allowing, at the intermediary network device, a second connection between the first client device and a second computing device other than the server, the second computing device connected to the first client device via the intermediary network device.

2. The method of claim 1, wherein the connection is blocked for a duration that is at least as long as a lifetime of an OTP used in the OTP protocol.

3. The method of claim 1, further comprising:
allowing a connection between a second client device and a computing device other than the server, the second client being connected to the computing device via the intermediary network device.

4. The method of claim 1, wherein detecting that the server uses OTP protocol comprises:
inspecting a secure socket layer (SSL) certificate received from the server.

5. The method of claim 1, wherein detecting that the server uses OTP protocol comprises:
analyzing information preconfigured at the intermediary network device.

6. The method of claim 1, wherein detecting that the server uses OTP protocol comprises:
detecting a keyword or pattern of characters in a uniform resource locator (URL) associated with the server.

7. The method of claim 1, wherein the intermediary network device comprises at least one of a router, a switch, a modem, a firewall, a hub, a hotspot, a wireless access point, a server, a proxy server, a gateway device, an intrusion detection system (IDS) device, an intrusion prevention system (IPS) device, and an Internet service provider (ISP) device.

8. The method of claim 1, further comprising:
receiving a request for credentials from the server; and
providing, by the intermediary network device, a human-authentication challenge to control access to the server.

9. The method of claim 1, further comprising:
upon verifying the identity of the server, allowing the request to connect to the server to proceed.

10. A computing device configured for securing data and computer systems, comprising:
a processor;
memory in electronic communication with the processor;
instructions stored in the memory, the instructions being executable by the processor to:
receive, at an intermediary network device, a request from a first client device to connect to a server;
verify, by the intermediary network device, an identity of the server;
detect, at the intermediary network device, that the server uses a one-time password (OTP) protocol, wherein detecting that the server uses an OTP protocol comprises comparing the identity of the server with a list of information identifying a plurality of servers that use the OTP protocol and associated user-defined policy protocol; and
perform, by the intermediary network device, an action according to the user-defined policy protocol based at least in part on the detecting, wherein performing the action comprises at least one of:

blocking, at the intermediary network device, a first connection between the first client device and a first computing device other than the server, the first computing device connected to the first client device via the intermediary network device; and allowing, at the intermediary network device, a second connection between the first client device and a second computing device other than the server, the second computing device connected to the first client device via the intermediary network device.

11. The computing device of claim 10, wherein the connection is blocked for a duration that is at least as long as a lifetime of an OTP used in the OTP protocol.

12. The computing device of claim 10, wherein the instructions are executable by the processor to:
allow a connection between a second client device and a computing device other than the server, the second client being connected to the computing device via the intermediary network device.

13. The computing device of claim 10, wherein the instructions to detect that the server uses OTP protocol comprise instructions executable by the processor to:
inspect a secure socket layer (SSL) certificate received from the server; and
analyze information preconfigured at the intermediary network device.

14. The computing device of claim 10, wherein the instructions are executable by the processor to:
receive a request for credentials from the server; and
provide, by the intermediary network device, a human-authentication challenge to control access to the server.

15. A computer-program product for securing data and computer systems, by a processor, the computer-program product comprising a non-transitory computer-readable medium storing instructions thereon, the instructions being executable by the processor to:
receive, at an intermediary network device, a request from a first client device to connect to a server;
verify, by the intermediary network device, an identity of the server;
detect, at the intermediary network device, that the server uses a one-time password (OTP) protocol, wherein detecting that the server uses an OTP protocol comprises comparing the identity of the server with a list of information identifying a plurality of servers that use the OTP protocol and associated user-defined policy protocol; and
perform, by the intermediary network device, an action according to the user-defined policy protocol based at least in part on the detecting, wherein performing the action comprises at least one of:

blocking, at the intermediary network device, a first connection between the first client device and a first computing device other than the server, the first computing device connected to the first client device via the intermediary network device; and allowing, at the intermediary network device, a second connection between the first client device and a second computing device other than the server, the second computing device connected to the first client device via the intermediary network device.

16. The computer-program product of claim 15, wherein the connection is blocked for a duration that is at least as long as a lifetime of an OTP used in the OTP protocol.

17. The computer-program product of claim 15, wherein the instructions are executable by the processor to:

allow a connection between a second client device and the computing device other than the server, the second client being connected to the computing device via the intermediary network device.

18. The computer-program product of claim 17, wherein the instructions are executable by the processor to:
perform one or more of the actions simultaneously.

19. The method of claim 3, further comprising:
performing one or more of the actions simultaneously.

20. The computing device of claim 12, wherein the instructions are executable by the processor to:
perform one or more of the actions simultaneously.

* * * * *